(12) United States Patent
Groenewald

(10) Patent No.: US 9,254,965 B2
(45) Date of Patent: Feb. 9, 2016

(54) CONVEYOR ASSEMBLY

(71) Applicant: Eugene Groenewald, Woerden (NL)

(72) Inventor: Eugene Groenewald, Woerden (NL)

(73) Assignee: KEY TECHNOLOGY, INC., Walla Walla, WA (US)

( * ) Notice: Subject to any disclaimer, the term of this patent is extended or adjusted under 35 U.S.C. 154(b) by 0 days.

(21) Appl. No.: 14/288,759

(22) Filed: May 28, 2014

(65) Prior Publication Data
US 2015/0344231 A1 Dec. 3, 2015

(51) Int. Cl.
| | |
|---|---|
| B65G 27/08 | (2006.01) |
| B65G 27/00 | (2006.01) |
| B65G 27/04 | (2006.01) |
| B65G 25/00 | (2006.01) |
| B65G 21/08 | (2006.01) |
| B65G 27/26 | (2006.01) |
| B65G 27/24 | (2006.01) |

(52) U.S. Cl.
CPC ............. *B65G 27/26* (2013.01); *B65G 27/04* (2013.01); *B65G 27/08* (2013.01); *B65G 27/24* (2013.01)

(58) Field of Classification Search
None
See application file for complete search history.

(56) References Cited

U.S. PATENT DOCUMENTS

| | | | |
|---|---|---|---|
| 2,662,193 A | 12/1953 | Weyandt | |
| 3,991,524 A * | 11/1976 | Ferrara | B24B 31/062 |
| | | | 451/326 |
| 5,184,716 A | 2/1993 | Gaines | |
| 5,454,669 A * | 10/1995 | Oziem | E21D 23/16 |
| | | | 405/291 |
| 5,967,294 A | 10/1999 | Patterson | |
| 6,851,548 B1 | 2/2005 | Dumbaugh | |
| 6,868,960 B2 * | 3/2005 | Jones | B65G 27/20 |
| | | | 198/762 |
| 7,399,383 B2 * | 7/2008 | Giovinazzo | B65G 27/24 |
| | | | 198/755 |
| 2006/0201783 A1 * | 9/2006 | Baldasari | B65G 45/16 |
| | | | 198/499 |

FOREIGN PATENT DOCUMENTS

| | | |
|---|---|---|
| CA | 2 5414 539 | 4/2010 |
| DE | 19832190 A1 | 6/2003 |

* cited by examiner

*Primary Examiner* — Kavel Singh
(74) *Attorney, Agent, or Firm* — Randall Danskin P.S.

(57) ABSTRACT

A conveyor assembly is described and which includes a reciprocally moveable and elongated conveyor bed; a drive assembly which imparts reciprocal motion to the elongated conveyor bed; and a controller for selectively energizing the drive assembly and which is operable to move a product deposited on the conveyor bed along a selectively adjustable path of travel.

26 Claims, 11 Drawing Sheets

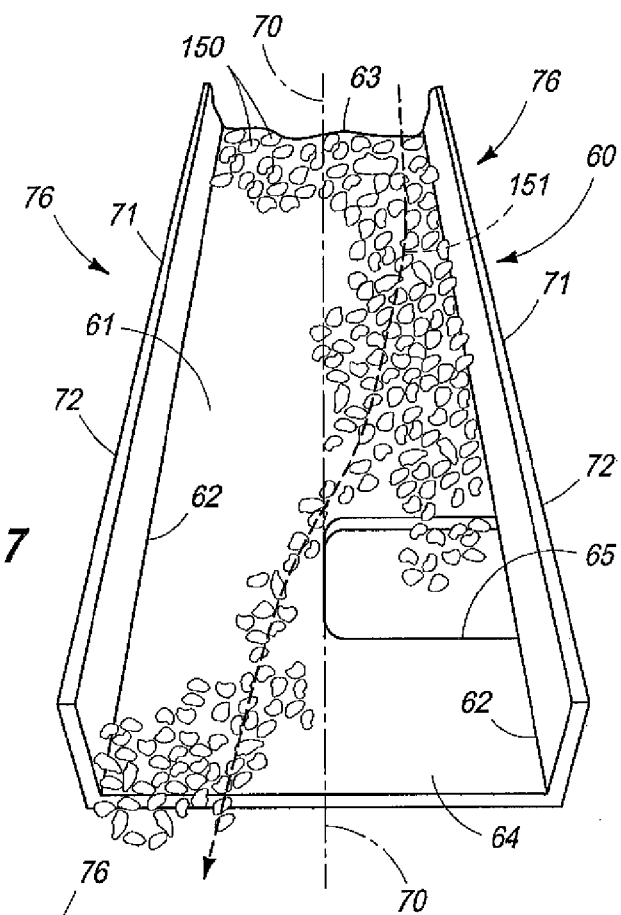
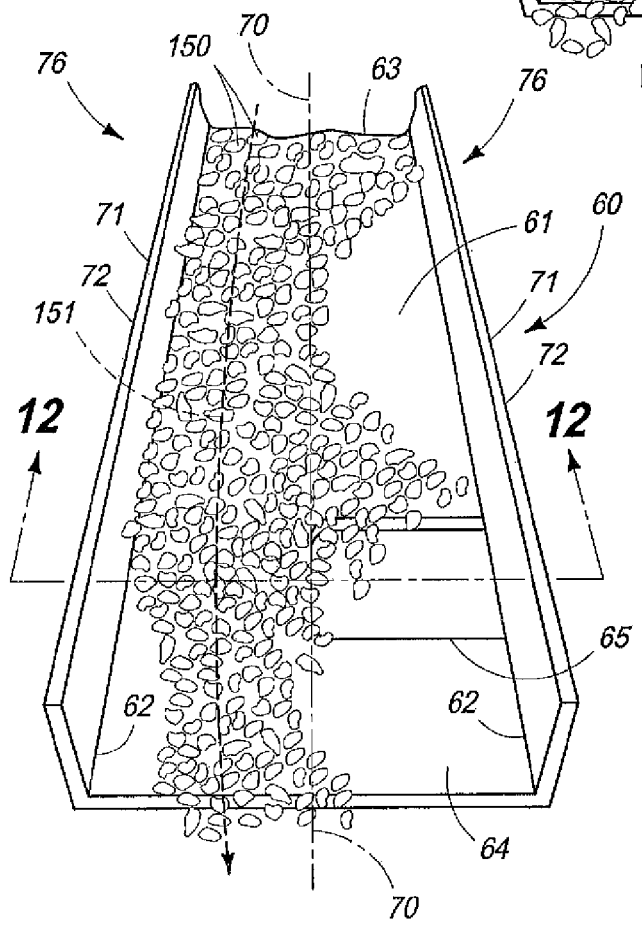

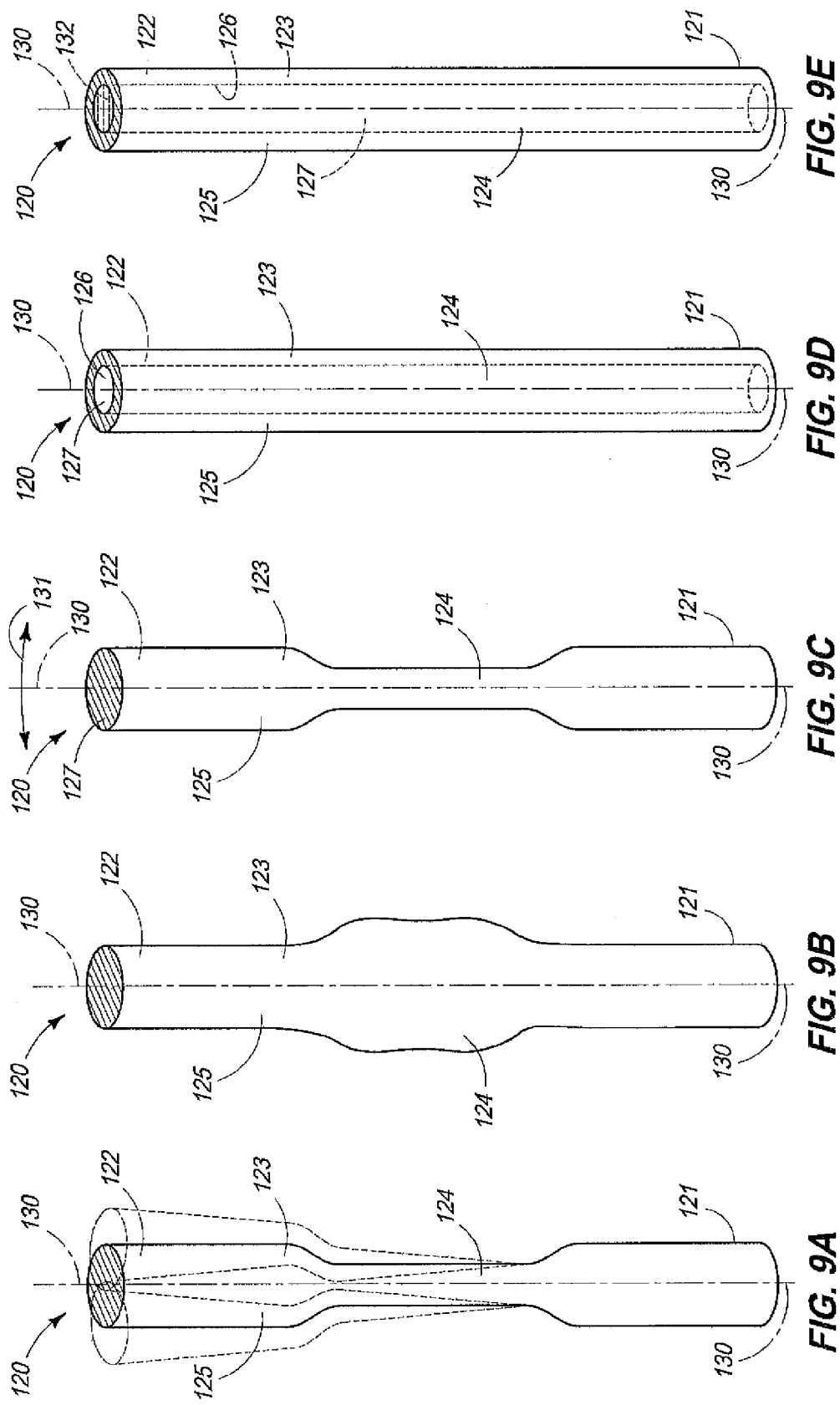

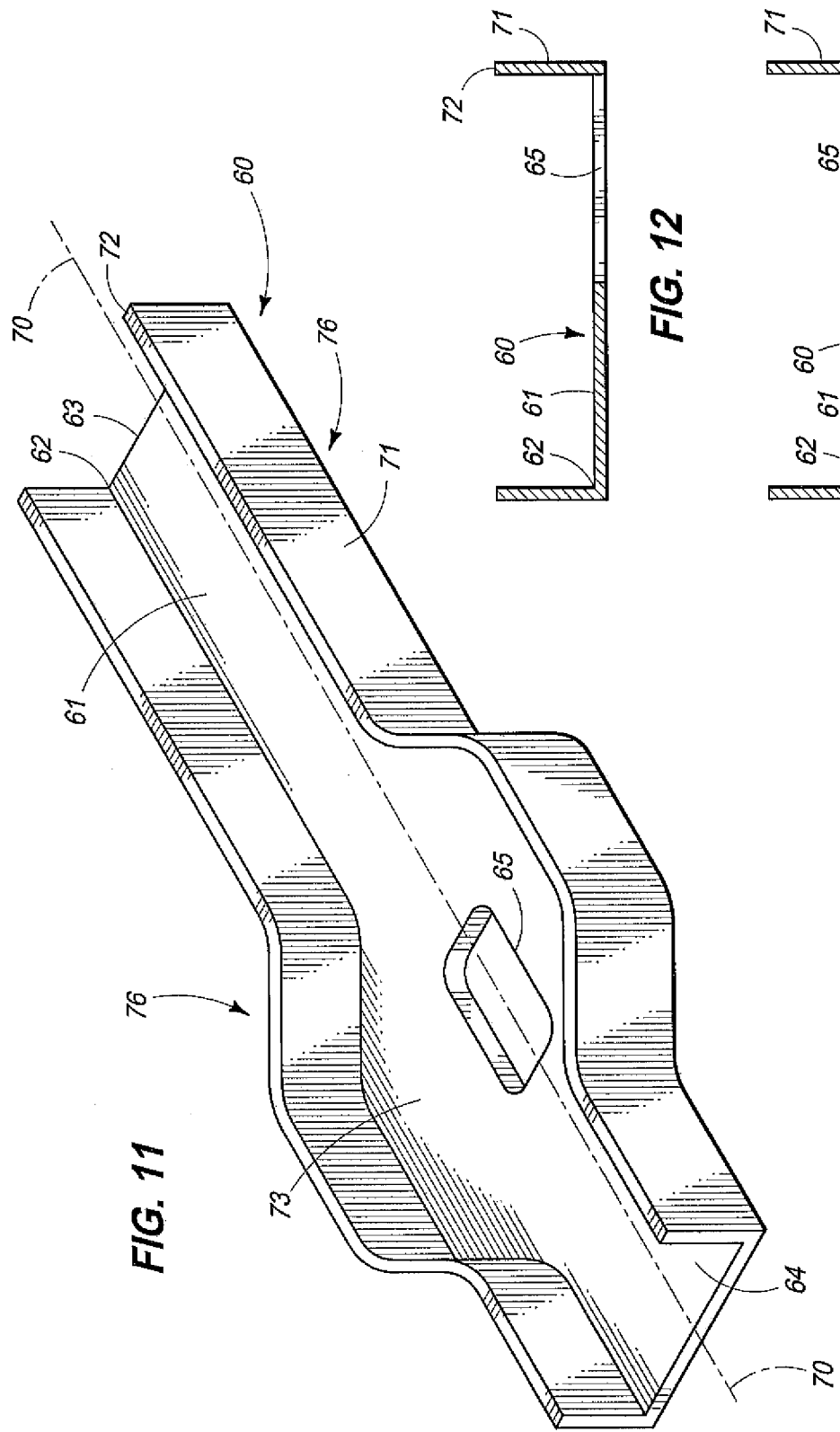

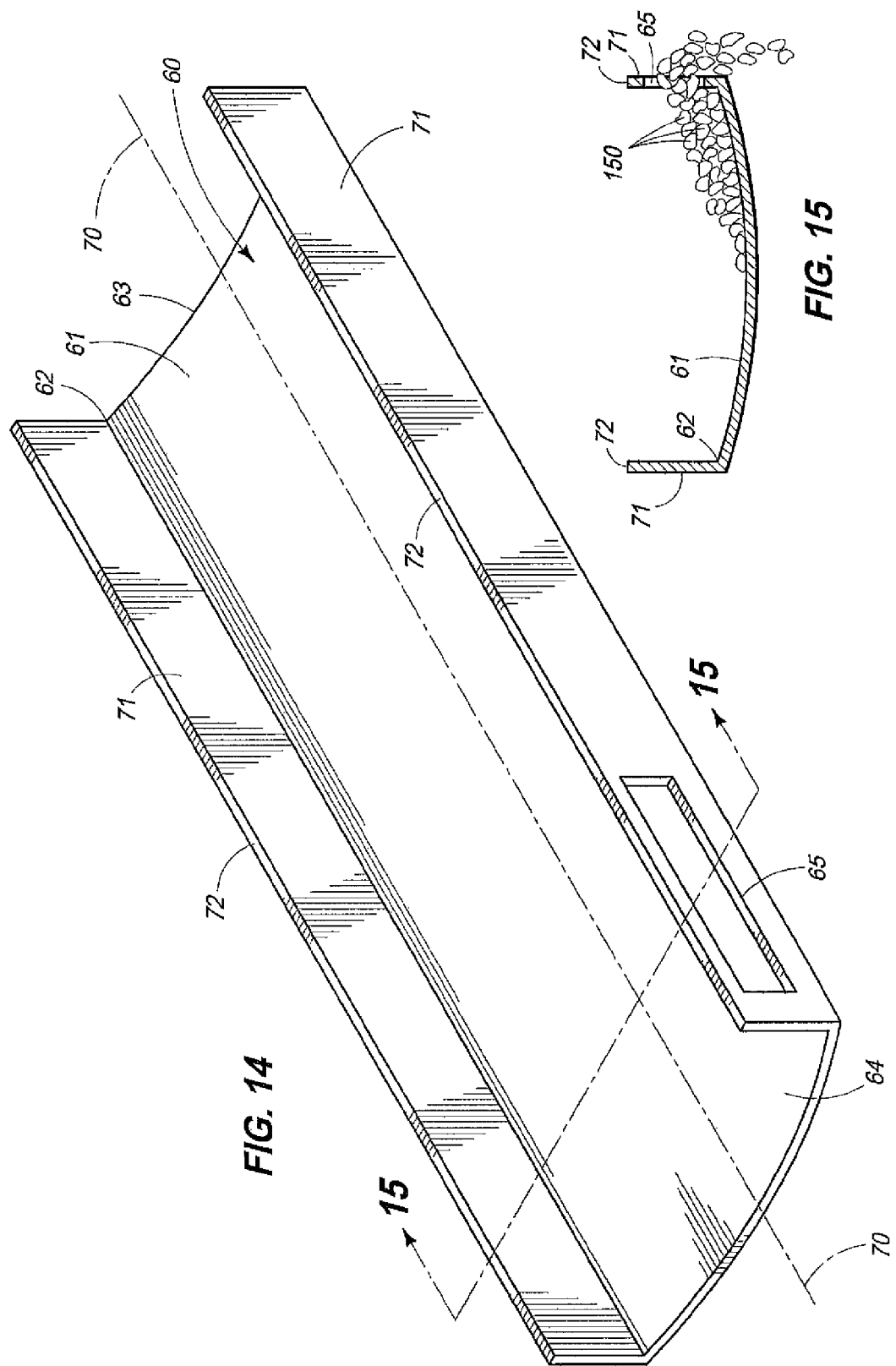

CONVEYOR ASSEMBLY

TECHNICAL FIELD

The present invention relates to a conveyor assembly, and more specifically to a conveyor assembly which, when selectively operated, is effective in moving a product which is deposited on the conveyor assembly along a selectively adjustable path of travel.

BACKGROUND OF THE INVENTION

Various vibratory conveyors of assorted designs have been employed in diverse industry segments through the years. Such vibratory conveyors have been used on a wide range of applications including mining, and more recently in various food handling applications. Vibratory conveyors, and more specifically, excited frame conveyors have been utilized for decades. Such vibratory conveyors have been employed to handle fragile food products such as potato chips, french fries and other coated food products in a manner which prevents damage to the product, or further prevents seasonings, and the like from becoming dislodged from the product as the product is moved between processing stations.

Excited frame conveyor designs have evolved through the years. Generally speaking, however, excited frame conveyors have included a longitudinally extending conveyor bed which has been used to transport product along a linear path of travel between adjacent work stations. In some applications, mechanical gates have been incorporated into the conveying beds of such exciting frame conveyors in order to allow a portion of a product stream to be diverted from the conveyor bed for various downstream purposes. While the mechanical gate assemblies employed on the aforementioned conveyors have operated with various degrees of success, shortcomings have long been recognized with such arrangements. Chief among the problems associated with such mechanical gates is the propensity for these assemblies to collect or otherwise be coated with various food products, and other debris, that might be introduced or mixed with the product stream. Besides the obvious problems associated with debris, and other food coating interfering with the mechanical operation of such gates, that is, the debris, often has a tendency to slow the operation of such gate assemblies, this debris also presents a sanitation problem. Additionally it is often difficult to clean such mechanical devices if the excited frame conveyor has been utilized to transmit a product that has constituent elements that might strongly adhere to the various surfaces of the mechanical gate arrangement. Of course difficulties in cleaning such devices inevitably leads to delays in converting various product lines so that they may be utilized with alternative food products as might be the case in a modern packaging plant.

A conveyor assembly which addresses these and other shortcomings in the prior art teachings and practices is the subject matter of the present application.

SUMMARY OF THE INVENTION

A first aspect of the present invention relates to a conveyor assembly which includes a reciprocally moveable, and linearly elongated conveyor bed having an upwardly facing conveying surface for supporting a product for movement, therealong; a drive assembly oriented so as to impart reciprocal motion to the linearly elongated conveyor bed, and to effect a movement of the product along the conveying surface; and a controller for selectively energizing the drive assembly so as to cause the product supported on the conveying surface of the linearly elongated conveyor bed to move along a predetermined, and selectively adjustable path of travel relative to the upwardly facing conveying surface.

Still another aspect of the present invention relates to a conveyor assembly which includes a base frame; a reciprocally moveable conveyor bed which is positioned in spaced relation relative to the base frame, and wherein the moveable conveyor bed is defined, at least in part, by a conveying surface which supports a product for movement along the conveying surface, and wherein the conveyor bed has a first intake end, and a second exhaust end, and further has opposite, laterally disposed sides; a multiplicity of elongated springs having a longitudinal axis, and which support the moveable conveyor bed in spaced relation relative to the base frame, and wherein at least some of the elongated springs can resiliently flex in all directions which are perpendicular to their respective longitudinal axes; a pair of drive assemblies which individually cooperate with each of the base frame, and the conveyor bed, and which, when selectively and periodically energized, imparts a predetermined reciprocal motion to the conveyor bed to effect the product movement in a predetermined direction along the conveying surface, and wherein the pair of drive assemblies are located adjacent to the opposite, laterally, outwardly disposed sides of the moveable conveyor bed, and wherein the selective, and periodic energizing of the respective drive assemblies simultaneously flexes the multiplicity of elongated springs about their respective longitudinal axes; and a controller which is operably coupled to the respective drive assemblies, and which selectively and periodically energizes the respective drive assemblies so as to cause the conveyor bed to reciprocally move in a given manner, and facilitate the movement of the product deposited on the conveying surface along a predetermined path of travel relative to the conveying surface.

These and other aspects of the present invention will be discussed in greater detail hereinafter.

BRIEF DESCRIPTION OF THE DRAWINGS

FIG. 7 is a third, partial, perspective, end view of a conveyor bed which forms a feature of the present invention.

FIG. 8 is a fourth, partial, perspective, end view of a conveyor bed which forms a feature of the present invention.

FIG. 9A is a first form of a spring which forms a feature of the present invention.

FIG. 9B is a second form of a spring which forms a feature of the present invention.

FIG. 9C is a side elevation view of the second form of the spring of the present invention.

FIG. 9D is a third form of a spring which forms a feature of the present invention.

FIG. 9E is a fourth form of a spring which forms a feature of the present invention.

FIG. 11 is a second, partial, perspective view of a conveyor bed which forms a feature of the present invention.

FIG. 12 is a transverse, vertical, sectional view showing a first form of a conveyor bed which is useful in the present invention.

FIG. 13 is a transverse, vertical, sectional view showing a second form of a conveyor bed which is useful in the present invention.

FIG. 14 is a partial, perspective, side elevation view showing yet another conveyor bed which finds usefulness in the present invention.

FIG. 15 is a transverse, vertical, sectional view taken from a position along line 15-15 of FIG. 14.

DETAILED DESCRIPTION OF THE PREFERRED EMBODIMENTS

This disclosure of the invention is submitted in furtherance of the constitutional purposes of the U.S. Patent Laws "to promote the progress of science and useful arts." (Article I, Section 8).

Figure 1:
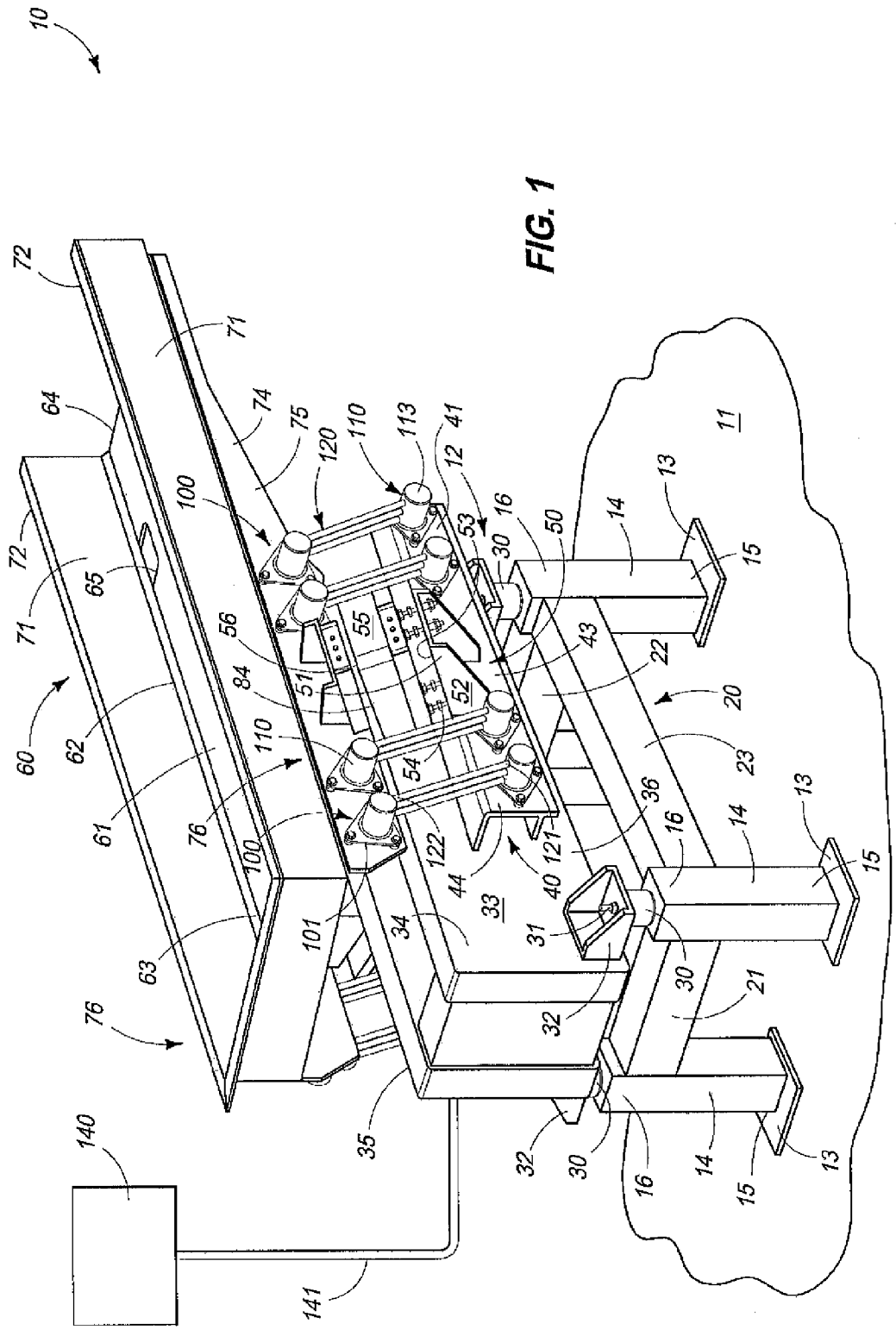
FIG. 1 is perspective, side elevation view of the conveyor assembly of the present invention.

A conveyor assembly which illustrates the teachings of the present invention is generally indicated by the numeral 10 in FIG. 1, and following. As seen in FIG. 1, the conveyor assembly 10 is positioned on a floor or supporting surface which is indicated by the numeral 11. The conveyor assembly 10 further includes a multiplicity of base pads 13 which individually rest on the floor or supporting surface 11, and further which may be affixed thereto by fasteners of various types. The conveyor assembly 10 includes a multiplicity of leg members 14 which are generally, narrowly, elongated, and further which extend vertically upwardly relative to the respective base pads 13. The leg members have a first end 15, which is affixed, as by welding or the like, to the individual base pads 13, and an opposite, distal, and upwardly extending second end 16. Affixed to the second end 16 of the respective leg members 14 are generally horizontally disposed support members which are identified by the numeral 20. The horizontal support members include first and second members 21 and 22, and oppositely opposed 3rd and 4th members 23 and 24, respectively. The respective horizontal support members are affixed by welding, or other suitable fasteners to the respective leg members 14 in order to provide a rigid frame upon which the conveyor assembly 10 is mounted for operation.

The conveyor assembly 10 includes a multiplicity of vibration isolators 30 which are individually positioned, and mounted, on the second end 16 of the respective leg members 14. The vibration isolators are held in place by a threaded post which is identified by the numeral 31. The threaded post is affixed or otherwise welded to the second end 16. The threaded post 31 is operable to releasably engage individual attachment brackets which are generally indicated by the numeral 32. The attachment brackets are generally L-shaped, and are further affixed by welding, or the like, to the drive support frame, and which is generally indicated by the numeral 33. Therefore, the drive support frame 33 is mounted in spaced relation relative to the base frame 12. The drive support frame 33 has a main body 34 which is defined, at least in part, by a top surface 35, and which further includes laterally, and spaced, side walls that are generally indicated by the numeral 36. Again, the attachment brackets 32 are mounted and affixed as by welding, or the like, to the lateral sidewalls 36, thereby supporting the drive support frame 33 in spaced relation relative to the base frame 12.

As seen in FIG. 1, and following, a spring support frame, and which is generally indicated by the numeral 40, includes first and second portions 41 and 42, respectively, and which are respectively attached as by welding or the like, to the lateral sidewalls 36 of the drive support frame 33. The respective first and second portions 41 and 42 have an elongated main body which is generally indicated by the numeral 43. The elongated main body has an outside facing surface 44, and which is operable to be engaged by a multiplicity of elongated, and resilient springs as will be discussed in greater detail, hereinafter. The first and second portions 41 and 42 are generally narrowly elongated and extend generally in a direction between the opposite ends of the drive support frame 33.

Figure 2:
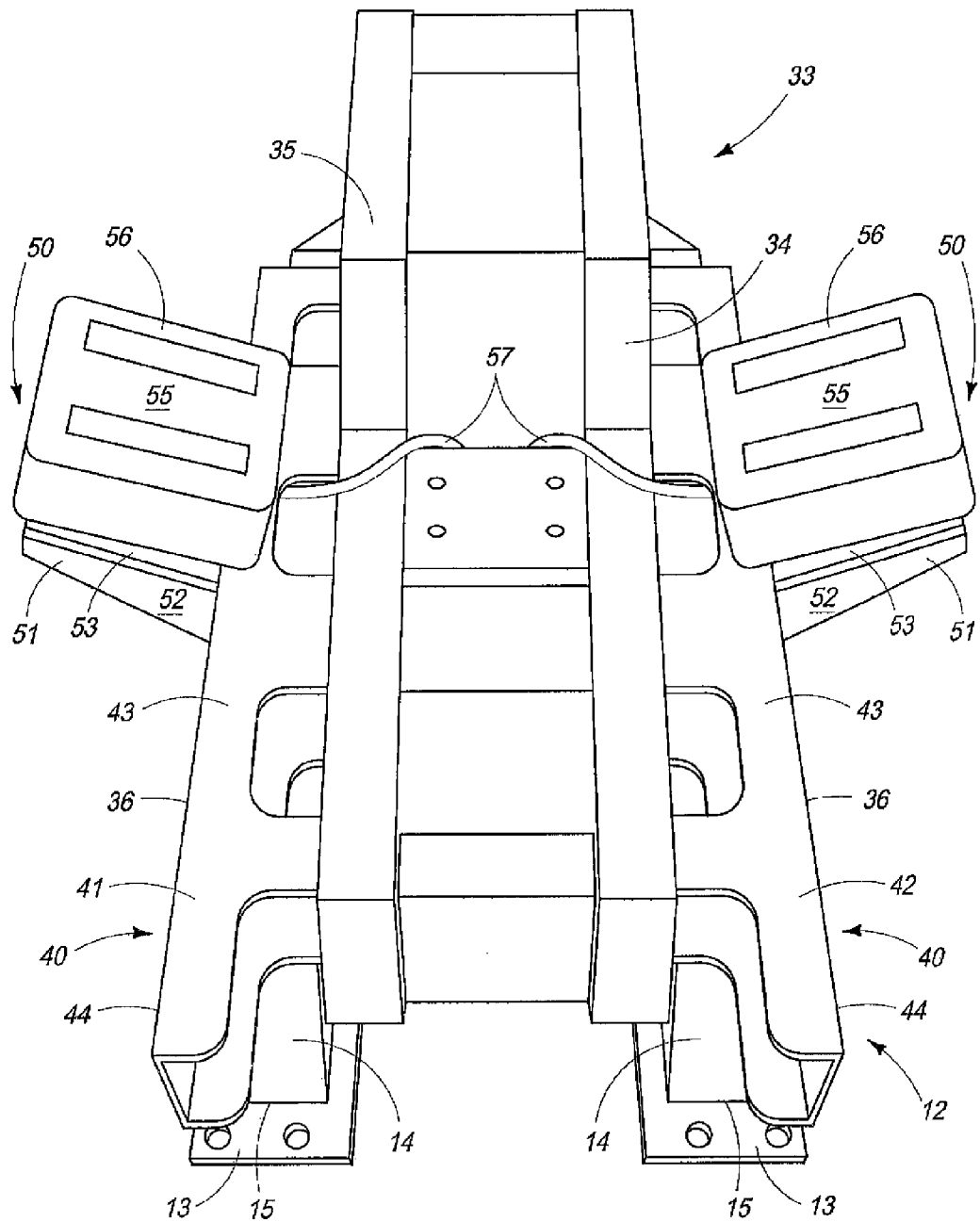
FIG. 2 is a perspective, top plan view of a base frame which forms a feature of the present invention.
Figure 3:
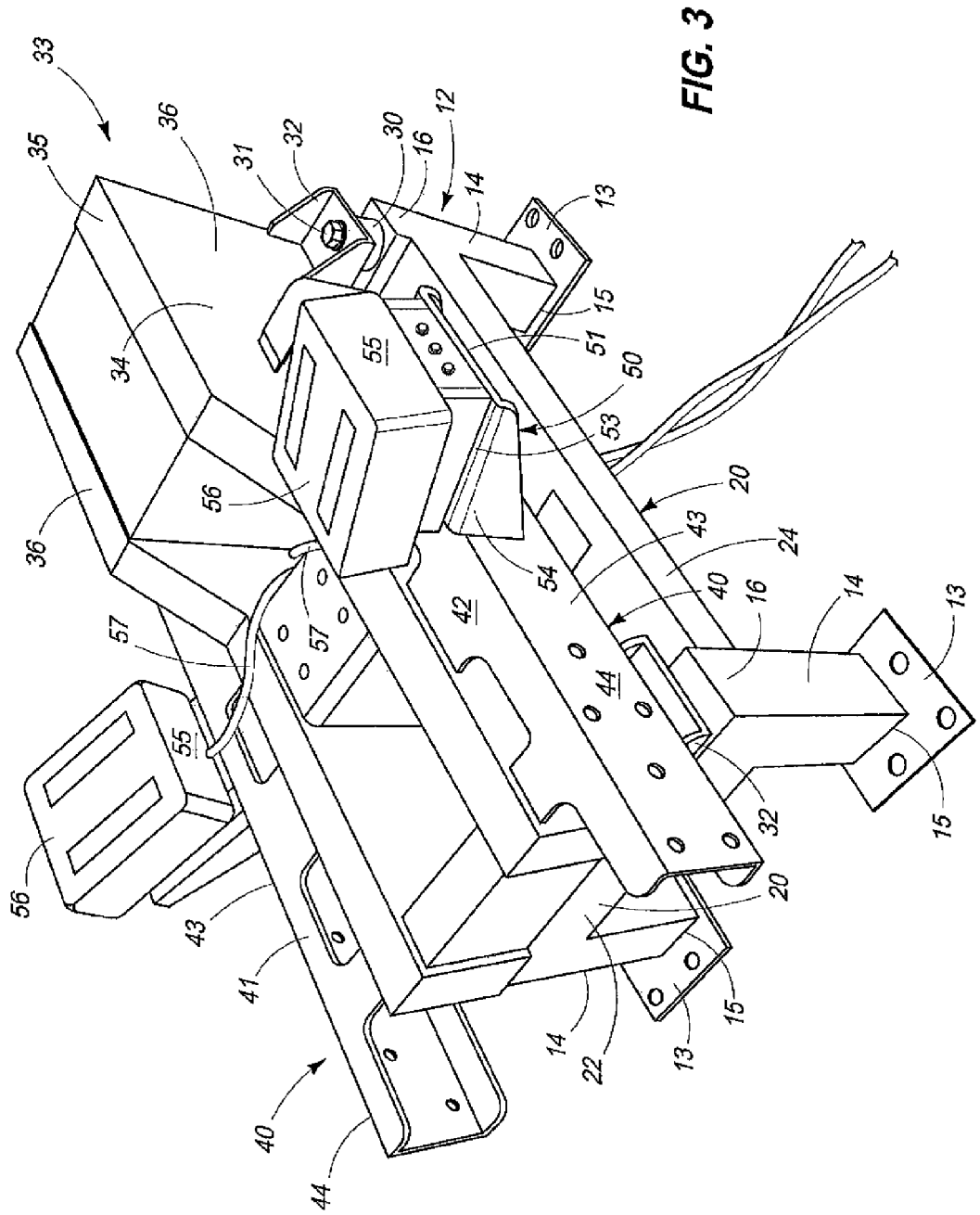
FIG. 3 is a perspective, side elevation view of the base frame and which forms a feature of the present invention.

The conveyor assembly 10 includes individual drive support brackets 50, and which are individually positioned on the opposite sides of the conveyor assembly 10. The respective drive support brackets 50 are each defined by a main body 51, and which has a pair of spaced, vertically extending sidewalls 52, and which are affixed, as by welding or the like, to the outside facing surface 44 of the individual spring support frames 40. The respective drive support brackets 50 are each positioned at a location intermediate to the opposite ends of the main body 43 of the spring support frame 40. The sidewalls 52 extend laterally outwardly relative thereto, and are positioned normal relative to the outside facing surface 44. The respective sidewalls 52 are further affixed to an upwardly facing surface 53, as by welding, and the like. The upwardly facing surface 53 is positioned at approximately an angle of about 22½° when measured from a horizontal plane. The upwardly facing surface 53 has affixed thereto screw-threaded adjustment members 54 and which extend substantially normally upwardly relative to the upwardly facing surface 53. Individual electromagnets 55 are mounted on the individual screws threaded adjustment members 54. The individual electromagnets constitute a drive assembly for the invention 10. The threaded adjustment members are used to adjustably, and spatially position the individual electromagnets 55 so that they may each be positioned to selectively drive, propel or reciprocate the conveyor bed as will be discussed in greater detail, below. As best seen by reference to FIG. 2, electrical conduits 57 are coupled to the individual electromagnets 55, and are used to both energize and selectively control the individual electromagnets 55 for the purposes which will be discussed in greater detail in the paragraphs which follow.

Supported on the base frame 12 is a reciprocally moveable, and linearly elongated conveyor bed which is generally indicated by the numeral 60. The elongated conveyor bed 60 is defined, in part, by a generally horizontally disposed conveying surface 61, and which supports a product for movement therealong. The movement of the product will be discussed in greater detail, hereinafter. The conveying surface 61 has opposing, spaced, longitudinally disposed peripheral edges 62; a first intake end 63; and a second, exhaust end 64. As seen in the drawings, a discharge aperture 65 is formed in the conveying surface 61, and is located in a position near the second exhaust end 64.

Figure 5:
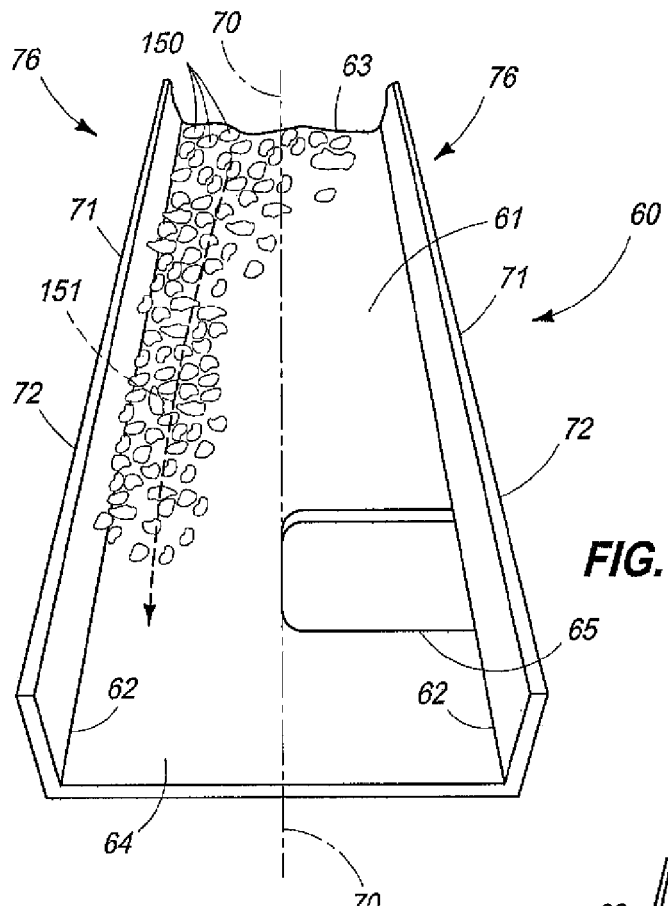
FIG. 5 is a partial, perspective, end view of a conveyor bed which forms a feature of the present invention.
Figure 6:
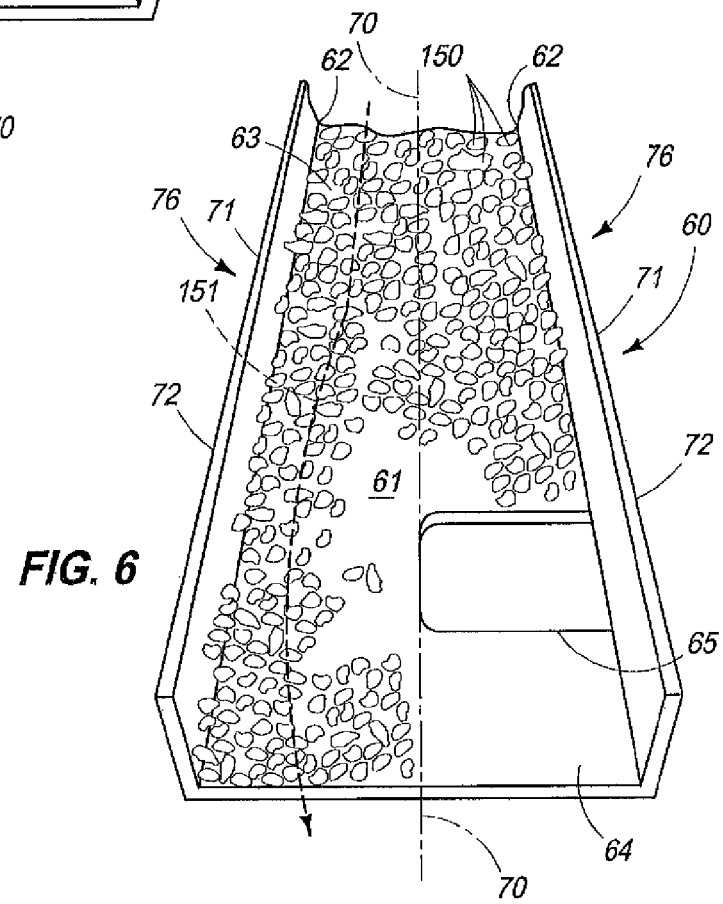
FIG. 6 is a second, partial, perspective, end view of a conveyor bed which forms a feature of the present invention.

The linearly elongated conveyor bed 60 is defined, at least in part, by a longitudinal axis which is generally indicated by the numeral 70. Still further, and extending upwardly from the opposite, peripheral edges 62 of the conveying surface 61 are substantially vertically extending sidewalls 71, and which confine, or otherwise maintain the product to be transported on, and in contact with, the conveying surface 61. Each of the respective sidewalls 71 have a top peripheral edge 72. As illustrated, the pair of sidewalls 71, typically have a substantially uniform height, although, in some forms of the invention the sidewalls may vary in their height dimension depending upon the depth of product which may be transported along the conveying surface 61. As seen in FIG. 8, the conveying surface 61 may have a uniform, transverse dimension extending substantially from the first intake end 63, to the second exhaust end 64; or it may have a variable, transverse dimension as illustrated in FIG. 11, and where an enlarged product flow region 73 is formed in a discrete region of the conveying surface 61, and adjacent to a discharge aperture 65. In this form of the invention (FIG. 11), the discharge aperture 65 is formed substantially centrally of the conveying surface 61, and in other forms of the invention 10 as seen in the drawings (FIG. 8, for example), the discharge aperture 65 is positioned laterally, outwardly relative to the longitudinal axis 70, and adjacent to one of the opposite, peripheral edges 62 thereof. As will be seen in the drawings, the discharge aperture 65 is typically formed in the conveying surface 61. However, in an alternative form the invention and which is best seen by reference to FIG. 14, the discharge aperture 65 may be formed in one of the individual sidewalls 71. As will be understood from a study of the drawings, the conveying surface 61 may be uniformly planar as seen in FIGS. 5 and 6, for example, however, as seen in FIG. 13, the conveying surface 61 may have a non-planar cross-sectional shape so as to provide a means whereby product when diverted or directed on a given path of travel may remain on the conveying surface 61, and is inhibited from piling up or otherwise collecting adjacent to one of the sidewalls 71, and then spill over the top edge 72 onto a factory floor, for example. As seen in FIG. 1, the linearly elongated conveyor bed 60 includes a pair of downwardly extending conveyor flange members which are indicated by the numeral 74. The conveyor flange members 74 extend substantially in a longitudinal direction between the first, intake end 63, and the second, exhaust end 64. Each of the downwardly extending conveyor flange members 74 have an outwardly facing surface which is labeled by the numeral 75.

Figure 4:
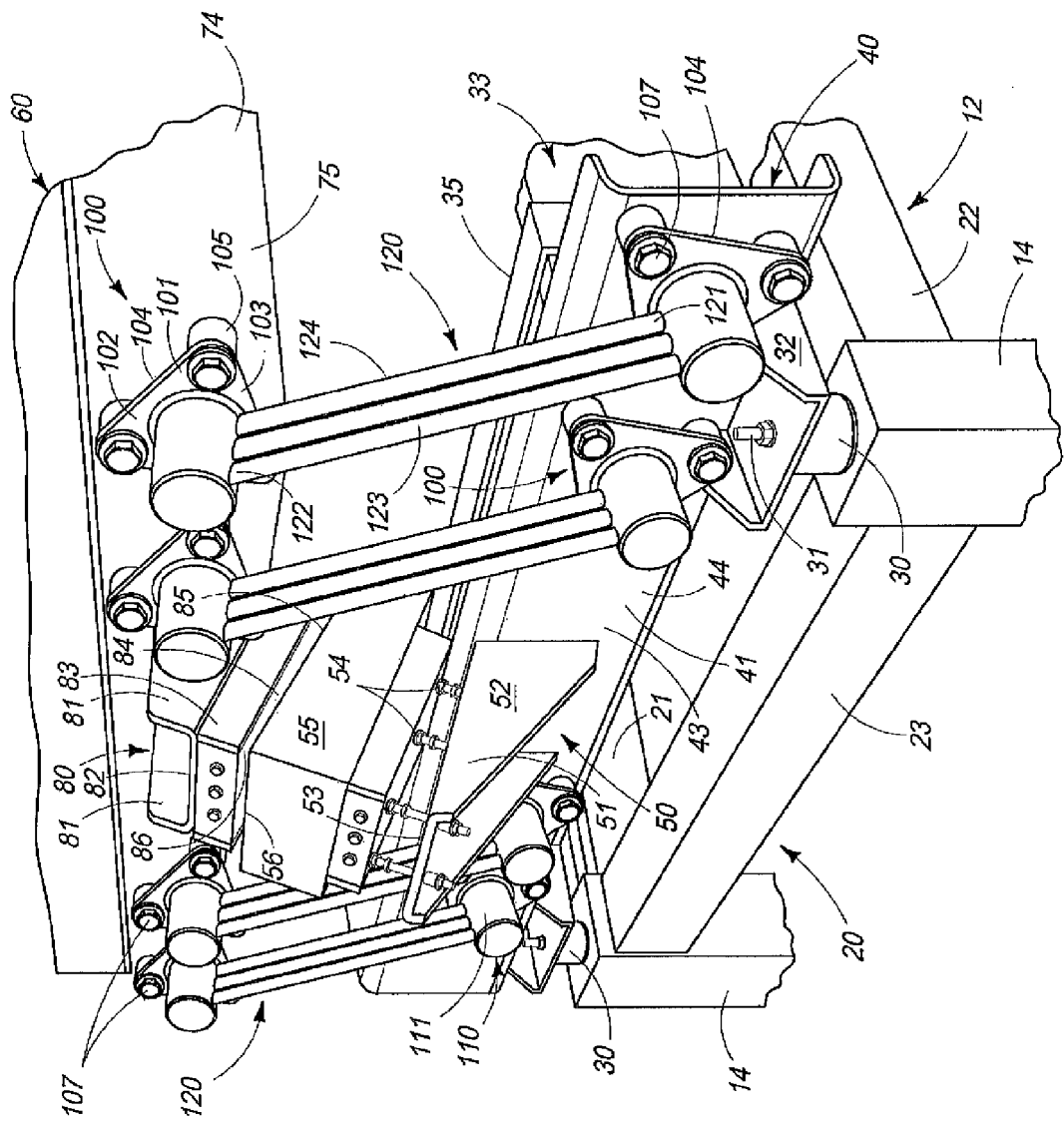
FIG. 4 is a partial, perspective, side elevation view of the conveyor assembly of the present invention.

As best seen in FIG. 4, a support bracket 80, which is formed of a pair of spaced, vertically disposed sidewalls 81, and a downwardly facing surface 82, is affixed, as by welding, or the like to the downwardly extending conveyor flange member 74. The respective support brackets 80 individually mount a magnetic attraction member 83, and which is located in spaced relation relative to the individual electromagnets 55, and which comprise a drive assembly for the conveyor assembly 10. A gap 84 is defined between the upwardly facing surface 56, of each of the electromagnetic assemblies 55, and the magnetic attraction member 83 which is spaced therefrom. The gap 84 is non-uniform in dimensions, and has a first end 85, which is positioned adjacent to the downwardly extending conveyor flange member 74, and a second end 86, and which is positioned laterally outwardly therefrom. The gap 84 diminishes in its dimensions when measured between the first end 85, and the second end 86 thereof.

Figure 10:
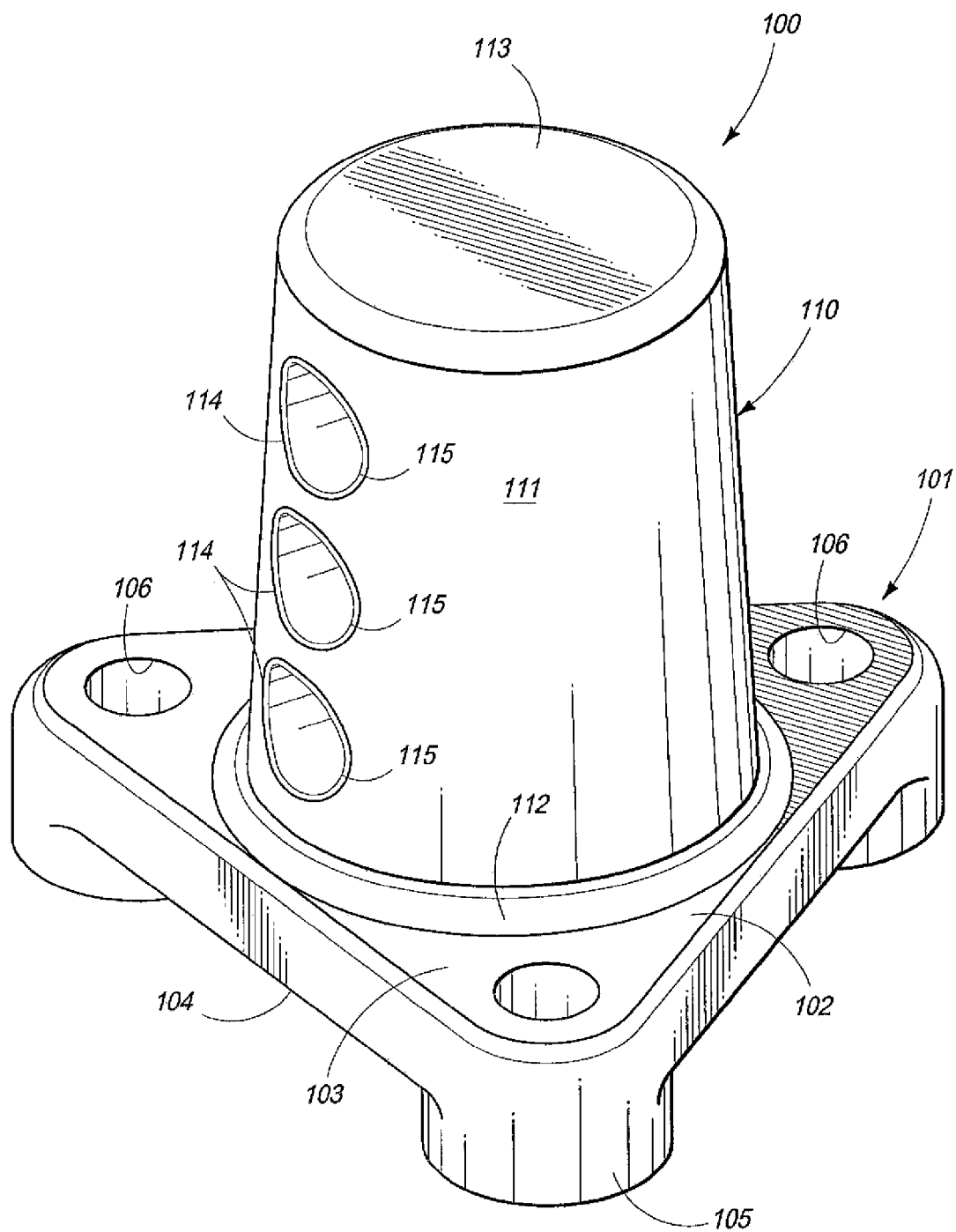
FIG. 10 is a perspective, side elevation view of a mounting fixture which forms a feature of the present invention.

The conveyor assembly 10 of the present invention includes a multiplicity of mounting fixtures which are generally indicated by the numeral 100, and which are best seen by reference to FIG. 10. The respective mounting fixtures provide many novel advantages relative to the new conveyor assembly 10. Chief among these advantages of the mounting fixtures is one which relates to the ease with which the current conveyor assembly 10 can be kept clean, and sanitary, when used in food processing applications, and where such assemblies are routinely exposed to water, food debris, and other particulate matter which, over time, renders the conveyor assembly 10 unsanitary. The mounting fixture 100, as seen in FIG. 10, includes an attachment plate 101, and which has a main body 102, and which, as illustrated, is somewhat triangular in its overall configuration. The main body 102 is defined by a top surface 103, and further has an opposite, bottom surface 104, which is substantially parallel thereto. Extending normally downwardly relative to the bottom surface 104 are individual legs 105, and which provide a convenient means for orienting, or otherwise locating the bottom surface 104 in a predetermined spaced relationship relative to the outwardly facing surface 75, of the downwardly extending conveyor flange member 74. This spacing of the main body 102 away from the underlying outwardly facing surface 75, provides a convenient means whereby an operator, (not shown), can easily clean or remove solid or liquid food debris and other materials and which may have come into contact with the conveyor assembly 10 during food processing operations. As illustrated in FIG. 10, individual fastener apertures 106 are formed in the main body 102, and extend downwardly through the main body 102 from the top surface 103, and through the respective downwardly extending legs 105, so that a fastener 107, as seen in FIG. 4, can pass therethrough and threadably engage the underlying spring support frame 40, or the previously mentioned downwardly extending conveyor flange member 74.

The mounting fixtures 100 further have attached thereto, and which extends substantially, normally, upwardly relative to the top surface 103, a spring receiver 110. Each of the spring receivers 110 have a main body ill, which is substantially frusto-conically shaped as best illustrated in FIG. 10. The main body 111 has a first end 112, which is secured to the top surface 103 of the attachment plate by means of welding or the like, and further has a second, distal end 113. It should be noted that the main body 111 of the spring receiver 110 is fabricated so as to provide no sharp edges, or other exterior facing structural topography which would allow for the easy capture of food debris in a manufacturing or food packaging or processing environment. Still further, the respective spring receivers 110 each have a multiplicity of spring seats 114 which are formed therein. As illustrated, the spring seats 14 are substantially uniformly cylindrical in shape. Further, it should be understood that in the fabrication of the conveyor assembly 10, a layer of adhesive 115 is applied to the inside facing surface of the spring receivers, and which define the individual spring seats 114. The layer of adhesive 115 secures the springs, which will be discussed in greater detail hereinafter, therein. However, it should be recognized that the main body 111 of the spring receiver 110 could be modified so as to allow a fastener, such as a screw and the like, to be inserted through the main body 111, and thereby affect a clamping of a spring within the respective spring seats 114. However, it is currently preferred to secure the springs, as will be discussed hereinafter, within the respective spring seats 114 by using a suitable adhesive 115. This described arrangement prevents the main body 111 from having a resulting configuration which allows food debris to become attached to any exterior facing fastener, for example, and which would be used for clamping purposes to secure the spring within the associated spring seat 114. It will be noted that the spring receiver 110, as well as the mounting fixture 100, in its overall configuration, is substantially symmetrical. Consequently, the mounting fixture 100, as illustrated, allows a manufacturer to assemble the disclosed conveyor assembly 10 using a single mounting fixture 100. This obviates the need for fabricating mounting fixtures, which might only be useful on either one side, or the other, of a conveyor assembly, as described.

The conveyor assembly 10 of the present invention includes a multiplicity of elongated and resilient springs 120, which individually support the reciprocally movable and linearly elongated conveyor bed 60 for selective reciprocal motion. This reciprocal motion imparts novel movement to a product along the conveying surface 61, as will be described in greater detail, below. Referring now to FIGS. 9A through 9E, respectively, the respective elongated springs 120 each, as displayed, are, at least in part, narrowly elongated, and further have a first end 121, and a second end 122. The respective first and second ends 121 and 122 are received and supported in the individual mounting fixtures 100, as illustrated in FIG. 1, and wherein the respective elongated springs 120, once properly mounted within the respective mounting fixtures, support the conveyor bed 60 in a predetermined, reciprocally movable relationship relative to the base frame 12. The respective elongated springs each have a main body 123. The main body has an intermediate portion 124. Further, each of the elongated springs 120 has an exterior-facing surface 125, which in the several forms of the invention as illustrated, have an outside diametral dimension which is, at least in part, uniform along a portion of the length of the main body 123. Still further, in some possible forms of the elongated spring 120, and as best illustrated by FIGS. 9D and 9E, respectively, the main body 123 has an interior-facing surface 126, which defines an internal cavity 127.

As illustrated in FIGS. 9A through 9E, respectively, and as mentioned above, the plurality of elongated springs 120 are at least, in part, narrowly cylindrical. As illustrated herein, the respective elongated springs 120 are fabricated from a resilient material, which allows movement about the longitudinal axis 130 of the main body 123. The elongated springs 120 can be fabricated from a number of different materials, however, the inventor has had great success in fabricating and utilizing elongated springs 120 which are manufactured from carbon fiber or the like. Referring now to FIG. 9A, one possible form of an elongated spring 120, and which finds usefulness in the present invention, is illustrated, and wherein an intermediate portion 124 of the main body 123 has an outside diametral dimension which is less than the outside diametral dimension as measured at either of the first or second ends 121 or 122, respectively. The intermediate portion 124, as seen in FIG. 9A, is cylindrical in cross-section. Further, and as illustrated in FIG. 9A, a spring 120 having that particular shape resiliently deflects in all radially oriented directions, equally well about the longitudinal axis 130. Referring now to FIG. 9B, a second possible spring 120 for use in the invention is shown. As seen in this view, the elongated spring, as seen in FIG. 9B, has a flattened intermediate region 124, which is best seen in FIG. 9C, and which permits the resulting elongated spring 120 to easily flex in one direction, which is generally along a line which is perpendicular to the flattened intermediate portion region 124. This line is labeled 131 in FIG. 9C. Referring now to FIG. 9D, it will be seen that a form of the elongated springs 120 may be provided, and where at least some of the elongated springs 120 are hollow, that is, they have a longitudinally extending internal cavity 127. Again, in this form of the invention, the elongated springs 120, as seen in FIGS. 9D and 9E, can flex equally well in all directions which are transverse to the longitudinal axis 130 thereof. Referring now to FIG. 9E, it will be recognized that one possible form of the invention includes at least some elongated springs 120 which have a second resilient material 132, which has a different nature or composition from that of the springs, and which is deposited in the internal cavity 127. The resilient material may be selected to provide a different resulting resiliency to the resulting composite elongated spring 120, and which results from the combination of the two materials. Still referring to FIG. 9E, another possible form of the invention may include the use of a pressurized fluid, which may be received within the internal cavity 127 of the main body 123. The use of a pressurized fluid within the internal cavity 127 can render the resulting elongated spring resiliently adjustable so that a manufacturer of such conveyor assemblies can fine tune the performance of the plurality of elongated springs to achieve various benefits for conveying different products. In the arrangement of springs, as illustrated in the drawings, the respective elongated springs 120 have a length dimension of about 20 centimeters to about 50 centimeters; and a diameter dimension of about 0.6 centimeters to about 2 centimeters.

Referring now to FIG. 1, it will be understood that the present invention 10 includes a controller, which is generally indicated by the numeral 140, and which further is operable to selectively energize the drive assembly, here depicted as the pair of individual electromagnets 55, so as to cause a product supported on the conveying surface 61, of the linearly elongated conveyor bed 60, to move along the predetermined and selectively adjustable path of travel relative to the upwardly conveying surface 61. The pattern of actuation of the drive assembly, here depicted as the individual electromagnets 55, is best understood and will be seen in FIGS. 5 through 8 and 16 through 18, respectively. As illustrated in those views, a product 150 which is being transported by the conveyor bed 60 is generally indicated. The product 150 is deposited on the first intake end 63 of the elongated conveyor bed 60. The controller 140 is then operable to selectively energize the drive assembly, here depicted as the individual electromagnets 55, in a given pattern as discussed, below, so as to cause the product 150 to move along in a selectively adjustable path of travel 151. As seen in FIGS. 5 through 8, and 16 through 18, respectively, the selectively adjustable path of travel 151 includes a first path of travel 152; a second path of travel 153; and a third possible path of travel 154. Other possible combinations of these paths of travel are possible, and will be obvious to one who is skilled in the art.

As seen in FIGS. 5 to 8; and 16 through 18, respectively, the product to be transported 150 may move along the selectively adjustable path of travel 151. These paths of travel may vary based upon the needs of the operator. In this particular case, reference is made to FIGS. 16, 17 and 18 to show the broad concept of the invention. In this regard, the first path of travel 152 constitutes a path of travel, which is substantially along and coaxial with the longitudinal axis 70 of the conveyor bed 60. When choosing this path of travel, it will be recognized that at least some of the product 150 may divert, and pass through the discharge aperture 65 as it moves between the first intake end 63, and the second, exhaust end 64 of the conveyor bed 60. A second possible path of travel for the products 150 is indicated by the numeral 153, and which is best seen in FIG. 17. In that operational mode, the controller 140 energizes the drive assembly 55 in such a manner so as to cause the product 150 to move to one side of the conveyor bed 76 so that most of the product traveling along the conveying surface 101 bypasses the discharge aperture 65 and reaches the second exhaust end 64. A third possible path of travel 154 is shown in FIG. 18, and wherein the controller 140 is operable to energize the drive assembly 55 comprising the pair of electromagnets 55 in such a way so as to cause the products 150 to move to an opposite side 76 of the conveyor bed 60 so that a preponderance of the products 150 are directed towards, and reach the discharge aperture 65. In this arrangement, the products pass through the discharge aperture 65, and under the influence of gravity. Other possible combinations of the selectively adjustable path of travel are seen in FIGS. 5 through 8, respectively, and where an operator, by employing the controller 140, can change the pattern or path of travel of the products 150, moving along the conveying surface 61, so as to facilitate a selective discharge of product 150 in a manner not possible, heretofore. One of the significant and novel advantages of the present invention 10 is that the arrangement as described herein allows for a discharge aperture 65 to be formed, and which includes no gate, or other mechanical assembly for selectively occluding the discharge aperture 65. This eliminates the need for other complex mechanical assemblies on the underside of the conveyor bed 60, and further allows for the conveyor bed to be much more useful because the subsequent cleaning of the conveyor bed 60 is expedited because no lengthy cleaning of an associated mechanical gate assembly is necessary in an arrangement such as shown in these drawings.

Figure 16:
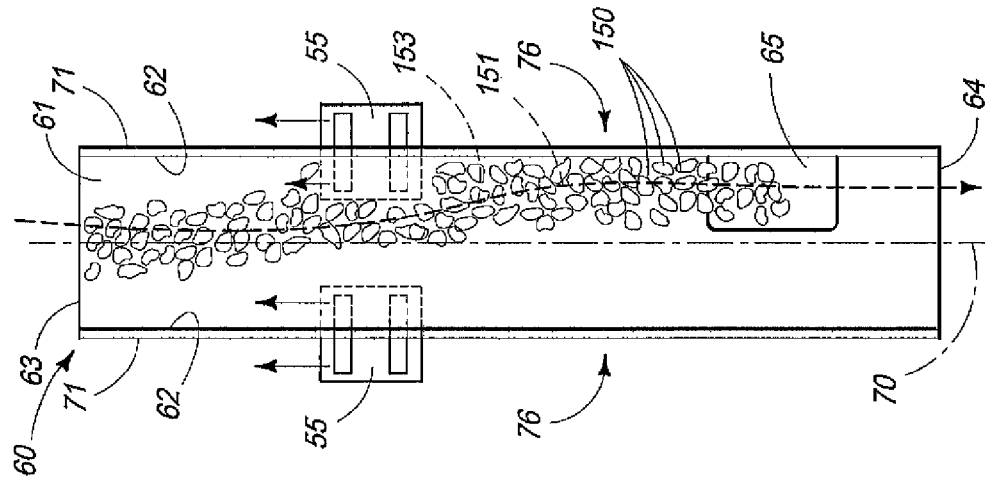
FIG. 16 is a partial, top, plan view showing the operation of the present invention during a first mode.
Figure 17:
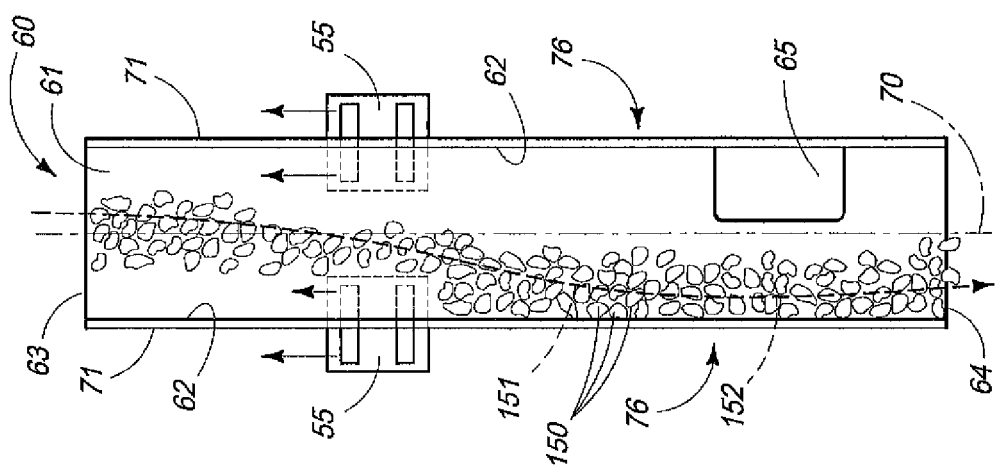
FIG. 17 is a partial, top, plan view showing the operation of the present invention in a second mode.
Figure 18:
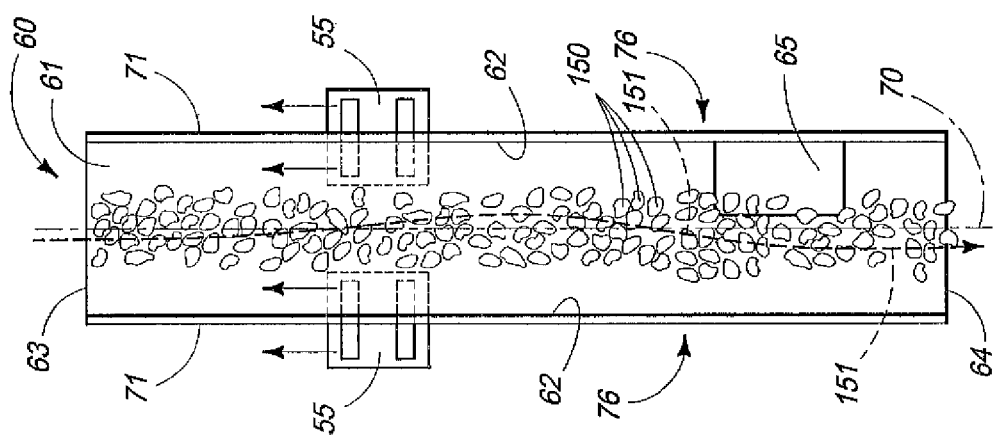
FIG. 18 is a partial, top, plan view showing the operation of the present invention in a third mode.

Referring now to FIGS. 16, 17 and 18, the drive assembly, as illustrated herein, and which includes a pair of electromagnets 55, achieves or provides the benefits of the present invention 10, and that is, to provide a conveyor assembly 10 and which, through the use of a controller 140, selectively energizes the drive assembly 55 so as to cause the product 150, and which is supported on the conveyance surface 61, to move along the predetermined, selectively adjustable paths of travel 151. As seen in FIG. 16, the drive assembly 55 is depicted as providing a selective amount of magnetic force during predetermined time intervals in order to reciprocate the conveyor bed 60 in a given manner so as to produce the movement of the product 150 along the selectively adjustable path of travel 151. The arrows labeled 160 depict a periodic synchronous energizing of the electromagnets 55 during given time intervals. As will be recognized by the drawings, the respective electromagnets 55 are energized during substantially the same time intervals to provide a magnetic attractive force, which causes the plurality of elongated springs 120 to resiliently bend about their respective longitudinal axis 130 because the conveyor bed 60 is drawn towards the electromagnets 55. As should be understood, when the respective electromagnets 55 are de-energized, the individually elongated springs, which have been resiliently deformed, by the action of the electromagnets return the conveyor bed 60 to an at rest position. The repeated energizing and de-energizing of the electromagnets 55 results in a reciprocal movement of the conveyor bed 60, so as to transport the production 150 therealong the conveying surface 61. The second arrow 170 depicts a selective energizing of the respective electromagnet assemblies, forming the drive assembly 55, and wherein differing amounts of resulting magnetic force are generated by the respective electromagnets. For example, and referring to FIG. 16, the electromagnets 55 are each energized during substantially the same time intervals 160, and the amount of magnetic force 170, which is exerted by the respective electromagnets 55 is substantially equal. When this event occurs, the resulting reciprocal force exerted by the drive assembly 55 on the conveyor bed 60 is such as to cause the product 150 to move along the first path of travel 151, and which is substantially coaxially aligned with the longitudinal axis 70 of the conveyor bed 60. As seen in FIG. 16 at least some of the product 50 to be transported may reach the discharge aperture 65, and then will fall from the conveyor bed 60, under the influence of gravity, and move along another path of travel, not shown. Referring now to FIG. 17, in this arrangement the controller 140 energizes the respective drive assembly, that is, the respective electromagnets 55 in a given manner, and whereby the electromagnets 55 are each energized during substantially the same time intervals 160. However, the amount of electromagnetic force exerted by the respective electromagnets 55, on the conveyor bed 60, are different. As illustrated in FIG. 17, less electromagnetic force 170 is exerted by the electromagnet 55 which is depicted on the right side of the conveyor 60, as illustrated. Because of the unequal amount of magnetic force exerted by one of the electromagnets 55 on the conveyor bed 60, the resilient springs 120, because they can flex about their respective longitudinal axis 130, causes the conveyor bed 60 to vibrate or reciprocate in a fashion whereby the product 150 being transported moves along a path of travel where the preponderance of the product 150 misses or avoids the discharge aperture 65, and reaches the discharge end 64 of the conveyor 60. An opposite situation occurs in FIG. 18 and where, again, the individual electromagnets 55 which form the drive assembly, are energized during substantially the same time intervals 160. However the opposite electromagnet 55 is energized, from that discussed, above, so as to exert less electromagnetic force on the conveyor bed 60. When this event occurs, the product 150 moves to the opposite side 76 of the conveyor bed 60, and a preponderance of the product 150 moves and exits the conveyor bed 60 by passing through the discharge aperture 65, and into another course of travel, not shown. Various combinations of this product movement can be seen in FIGS. 5 through 8, and where an operator, by the use of the controller 140, can move product 150 along, and between the three courses of travel as shown in FIGS. 16 to 18, to achieve selective discharge of the product 150 in a manner not possible, heretofore. Referring now to FIG. 11, an alternative form of the conveyor bed 60 is provided and whereby, as earlier noted, includes an enlarged product flow region 73. This region allows the product 150 to be transported to move around the discharge aperture 65. This arrangement also prevents products 150 which are so diverted around the discharge aperture 65 from piling up or accumulating in such a manner that the product 150 overflows in part, over the top peripheral edge 72. As seen in FIG. 14, another alternative form of the conveyor bed 60 is provided, and wherein the discharge aperture 65 is provided in one of the sidewalls 71 as seen in FIG. 15, and upon selective activation of the drive assembly 55, the product 150 may move to one side, or the other 76 of the conveyor bed 60. However, when the product moves to the side of the conveyor bed where the discharge aperture 65 is formed in the sidewall 71, product 50 moves through the discharge aperture 65 under the influence of gravity so as to move into another course of travel, not shown.

Operation

The operation of described embodiments of the present invention are believed to be readily apparent, and are summarized in the paragraphs that follow.

In its broadest aspect a conveyor assembly 10 is described, and which includes a reciprocally moveable, and linearly elongated conveyor bed 60, and which further has an upwardly facing conveying surface 61 for supporting a product 150 for movement therealong. The conveyor assembly 10 further includes a drive assembly 55, which is oriented so as to impart reciprocal motion to the linearly elongated conveyor bed 60, and to effect the movement of the product 150 along the conveying surface 61. Still further, the conveyor assembly 10 further includes a controller 140 for selectively energizing a drive assembly 55 so as to cause the product 150, and which is supported on the conveying surface 61 of the linearly, elongated conveyor bed 60, to move along a predetermined and selectively adjustable path of travel 151 relative to the upwardly facing conveying surface 161. As described, the linearly elongated conveyor bed 60 is defined, at least in part, by a longitudinal axis 70, and wherein the reciprocal motion of the conveyor bed 60 is directed generally and at least in part along the longitudinal axis 70 thereof.

The conveyor assembly 10, as described, includes a base frame 12 for supporting the linearly elongated conveyor bed 60 for reciprocal movement. In the arrangement as illustrated, the drive assembly 55, as described, cooperates, at least in part, with the base frame 12. A plurality of elongated springs 120 are individually mounted to both the base frame 12, and on the linearly elongated conveyor bed 60. The individual elongated springs support the linearly elongated conveyor bed 60 for reciprocal motion, and in spaced relation relative to the base frame 12. In the arrangement as shown in the drawings, the conveyor assembly 10 includes a conveying surface 61, which has a first intake end 63, and a second exhaust end 64. Still further, the conveying surface 61 has opposite peripheral edges 62, which extend between the first intake end, and the second exhaust end. The linearly elongated conveyor bed 60 has a pair of upwardly extending sidewalls 71, which are individually affixed along the respective peripheral edges of the conveying surface 61. As seen in the drawings, the discharge aperture 65 is formed in the linearly elongated conveyor bed 60 at a location which is between the first intake end and 63, and the second exhaust end 64 thereof. Further, as seen, the discharge aperture 65 is found in one form of the invention in the conveying surface 61 of the conveyor bed 60, and in a location where it is aligned with the longitudinal axis 70 of the linearly elongated conveyor bed 60. In an alternative form, the discharge aperture 65 may be laterally offset relative to the longitudinal axis 70 of the conveyor bed 60. In still another possible form of the invention, the discharge aperture 65 can also be located in one of the upwardly extending sidewalls 71 of the conveyor bed 60.

As illustrated in the drawings, the linearly elongated conveyor bed 60 has opposite sides 76. The drive assembly 55 includes a pair of drive assemblies which are individually located, at least in part, on the opposite sides 76 of the linearly elongated conveyor bed 60, and which are further located intermediate relative to the first intake end 73, and the second exhaust end 64 of the conveyor bed 60 (not shown). In one possible form of the invention, the pair of drive assemblies 55 include individual electric motors which, when energized by the controller, rotate in an eccentric weight, which is effective to impart the desired reciprocal motion to the linearly elongated conveyor bed 60. In another form of the invention 10, and in which is illustrated, the drive assembly 55 includes individual electromagnetic assemblies 55 and which, when selectively energized by the controller, imparts a desired reciprocal motion to the linearly elongated conveyor bed 60. As illustrated, the controller 140 selectively energizes the respective drive assemblies 55 so as to effect a predetermined reciprocal movement of the linearly elongated conveyor bed 60, and to further cause the product 150 to move along the predetermined, and selectively adjustable path of travel 151, relative to the upwardly facing conveying surface 61. As illustrated in the drawings, the predetermined and selectively adjustable path of travel 151 of the product 150, as it moves along the upwardly facing conveyor surface 61, includes a path of travel 151 which is oriented along and coaxial with the longitudinal axis 70 of the linearly elongated conveyor bed 60; or along and in contact with either of the upwardly extending sidewalls 71 of the linearly elongated conveyor bed 60. Still further, the controller 140 may be selectively adjusted to cause movement of the product 150, either along the longitudinal axis 70 of the linearly elongated conveyor bed 60, and the respective upwardly extending sidewalls 71 of the same conveyor bed 60.

The conveyor assembly 10 includes a plurality of elongated springs 120, which are, at least in part, narrowly cylindrical as seen in FIG. 9. In some possible forms of the invention, the respective elongated springs 120 may be hollow. In one possible form of the invention, the hollow elongated springs 120 are filled with a second resilient material 132, which imparts to the respective elongated springs 120 a different or adjustable resiliency. Still further, and in yet another form of the invention, the invention includes an elongated hollow spring, and wherein a pressurized fluid is enclosed within the hollow elongated springs to impart an adjustable and different resiliency. As noted above, the elongated springs are narrowly elongated, and in one preferred, and possible form of the invention the springs are fabricated from carbon-fiber. As seen in the drawings, the respective elongated springs each have opposite ends 121 and 122, and further have a diametral dimension which is uniform when measured between the first and second ends thereof. In one possible form of the invention, the springs 120 as provided has a diminished dimension in an intermediate region 124, and which is located between the opposite first and second ends thereof. In another possible form of the invention, the respective elongated springs have a diametral dimension which increases in the intermediate region, and which is located between the opposite first and second ends thereof. As seen in the drawings, the conveying surface 61 of the linearly elongated conveyor bed 60 may have a uniform transverse dimension when measured between the first intake end 63 and the second exhaust end 64 thereof. In another possible form of the invention, the conveying surface 61 has a non-uniform transverse dimension when measured between the opposite intake and exhaust ends. As further seen in the drawings, the linearly elongated conveyor bed 60, and more specifically the conveying surface 60 may be substantially planar (FIG. 12), and in another form of the invention the conveying surface 61 may be non-planar (FIG. 13).

As illustrated in the drawings, individual mounting fixtures 100 for securing the elongated springs 120 to each of the base frame 12, and the linearly elongated conveyor bed 60, are provided. The respective mounting fixtures 100 orient the respective plurality of the elongated springs 120 in spaced relation, and laterally outwardly relative to each of the base frame 12, and the linearly elongated conveyor bed 60, so as to allow for the effective cleaning of each of the elongated springs 120; base frame 12; and the linearly and elongated conveyor bed 60. In one possible arrangement, the respective elongated springs 120 are adhesively secured to and within the respective mounting fixtures 100. In another possible form of the invention 10, the respective elongated springs 120 may be mechanically secured, as by clamping, to the respective mounting fixtures 100. As should be understood, the respective elongated springs 60 have a length dimension of about 20 centimeters to about 50 centimeters; and a diametral dimension of about 0.6 centimeters to about 2 centimeters.

As noted above, a pair of drive assemblies 55 are provided, and which individually cooperate with each of the base frame 12, and the conveyor bed 60, and which, when selectively and periodically energized by the controller 140, imparts a predetermined reciprocal motion to the conveyor bed 60 to effect the product 150 movement in a predetermined direction along the conveying surface 61. The pair of drive assemblies 55 are located adjacent to the opposite, laterally outwardly disposed sides 76 of the moveable conveyor bed 60. The selective and periodic energizing of the respective drive assemblies 55 simultaneously flexes the multiplicity of elongated springs 120 about their respective longitudinal axes 130. As earlier noted, a controller 140 is operably coupled to the drive assembly 55, and which selectively and periodically energizes the respective drive assemblies 55 so as to cause the conveyor bed 60 to reciprocally move in a given manner to facilitate the movement of the product 150, and which is deposited on the conveying surface 61, and along a predetermined path of travel 151 relative to the conveying surface 61.

As seen in the drawings, some of the respective drive assemblies 55 are individually located, at least in part, on the opposite, laterally disposed sides 76 of the conveyor bed 60, and between the first intake end 63 and the second exhaust end 64 thereof. In the arrangement as shown in FIGS. 1 and 16, the controller 140 synchronously energizes the respective drive assemblies 55 so as to cause a reciprocal movement of the conveyor bed 60 and which causes the product 150 to move along the predetermined path of travel 151. In this regard, the selective energizing of the respective drive assemblies 55 causes a predetermined amount of force to be imparted to the conveyor bed 60 so as to move the conveyor bed in a first direction, and wherein the movement of the conveyor bed in the first direction is effective in resiliently and forcibly bending or flexing the multiplicity of the elongated springs 120. Upon de-energizing the respective drive assemblies 55, the individual elongated springs 120 will resiliently move the conveyor bed 60 in a second, opposite direction.

In the arrangement as illustrated in FIG. 16, the synchronous energizing of the respective drive assemblies 55 takes place such that the drive assemblies 55 each impart equal amounts of force to the conveyor bed 60. In this first mode of operation, the conveyor bed 60 moves the product 150, which is deposited on the conveying surface 61, along the predetermined path of travel 151, and which is substantially and generally coaxially aligned with the longitudinal axis 70 of the conveyor bed 60. In another possible mode of operation, the reciprocal motion of the conveyor bed 60, and which is generated by the operation of the electromagnets 55, moves the products 150, which are deposited on the conveying surface 61, along the predetermined path of travel 151, and which is non-aligned relative to the longitudinal axis 70 of the conveyor bed 60. As recognized from FIGS. 17 and 18, the path of travel 151 of the product 150, along the conveying surface 61, may be such that the product moves to a side 76 of the conveyor bed, which is opposite to the side of the conveyor where the drive assembly 55, which is generating a greater amount of magnetic attractive force, is operating and adjacent to the side of the conveyor bed 60, where the drive assembly 55 which is generating a lesser amount of magnetic attractive force is.

As illustrated in the drawings, the pair of drive assemblies 55 each have a selectively energizable electromagnet having an upwardly facing surface 56, and which is located below the conveyor bed 60. The respective electromagnets 55, when periodically energized, asserts a magnetic force which magnetically attracts, and moves the conveyor bed 60 in the direction of the electromagnets. Further, the motion of the conveyor bed 60 in the direction of the electromagnets 55 simultaneously flexes the multiplicity of the elongated springs 120, and narrows or reduces the dimensions of the gap 84. On the other hand, when the electromagnets 55 are de-energized, they respectively no longer magnetically attract the conveyor bed 60, and simultaneously the multiplicity of previously flexed elongated springs 120 forcibly moves the conveyor bed 60 in a direction away from the respective electromagnets 55, thus imparting reciprocal motion to the conveyor bed 60. In the arrangement as shown in the drawings, the upwardly facing surface 56 of the respective electromagnets 55 are each located in an angular non-parallel orientation relative to the conveying surface 61 of the conveyor bed 60. This angular arrangement allows for continued reciprocal motion of the conveyor bed 60 when the respective drive assemblies 55 are exerting unequal amounts of magnetic force to the conveyor bed 60 by way of the fixture 83 which is provided, and which is magnetically attracted to the respective electromagnets and is mounted on the conveyor bed 60. The fixture 83 extends laterally outwardly relative thereto. The fixture 83 has a downwardly oriented surface, which is located in spaced relation relative to the upwardly facing surface 56 of the respective electromagnets 55, so as to form a predetermined gap 84. The gap has a cross-sectional dimension, which diminishes as that dimension is measured in a direction extending from the conveyor bed 60, and laterally outwardly therefrom.

Therefore, it will be seen that the conveyor assembly 10 of the present invention provides many advantages and novel features not known or used before in vibratory conveyors. The present invention is easy to employ, can be readily maintained in a sanitary condition when processing food products, and further allows a user to selectively divert or direct products along alternative paths of travel without using traditional mechanical gates, which have been known to be difficult to clean and to operate under certain operational conditions.

In compliance with the statute, the invention has been described in language more or less specific as to structural and methodical features. It is to be understood, however, that the invention is not limited to the specific feature shown and described since the means herein disclosed comprise preferred forms of putting the invention into effect. The invention is, therefore, claimed in any of its forms or modifications within the proper scope of the appended claims appropriately interpreted in accordance with the doctrine of equivalence.

The invention claimed is:

1. A conveyor assembly, comprising:
    a reciprocally moveable, and linearly elongated conveyor bed having an upwardly facing conveying surface for supporting a product for movement, therealong;
    a base frame for supporting the linearly elongated conveyor bed for reciprocal movement;
    a pair of drive assemblies oriented so as to impart reciprocal motion to the linearly elongated conveyor bed, and to effect a movement of the product along the conveying surface, and wherein the respective drive assemblies are mounted, at least in part, on the base frame;
    a plurality of elongated and cylindrically shaped springs which are individually mounted to both the base frame and on the linearly elongated conveyor bed, and which supports the linearly elongated conveyor bed for reciprocal motion, and in spaced relation relative to the base frame; and
    a controller for selectively energizing the respective drive assemblies so as to cause the product supported on the conveying surface of the linearly elongated conveyor bed to move along a predetermined and selectively adjustable path of travel relative to the upwardly facing conveying surface.

2. A conveyor assembly as claimed in claim 1, and wherein the linearly elongated conveyor bed is defined, at least in part by a longitudinal axis, and wherein the reciprocal motion of the conveyor bed is directed generally along the longitudinal axis.

3. A conveyor assembly as claimed in claim 2, and wherein the conveying surface has a first, intake end; a second, exhaust end; and opposite peripheral edges which extend between the first, intake end, and the second, exhaust end, and wherein the linearly elongated conveyor bed has a pair of upwardly extending sidewalls which are individually affixed along the respective peripheral edges of the conveying surface, and wherein a discharge aperture is formed in the linearly elongated conveyor bed at a location which is between the first, intake end, and the second, exhaust end thereof.

4. A conveyor assembly as claimed in claim 3, and wherein the discharge aperture is positioned at a predetermined location along the conveying surface of the conveyor bed, and is aligned with the longitudinal axis of the linearly elongated conveyor bed, or further is laterally offset relative to the longitudinal axis of the linearly elongated conveyor bed, and wherein the predetermined location of the discharge aperture can further be located in one of the upwardly extending sidewalls of the linearly elongated conveyor bed.

5. A conveyor assembly as claimed in claim 4, and wherein the linearly elongated conveyor bed has opposite sides, and wherein the pair of drive assemblies are individually located, at least in part, on the opposite sides of the linearly elongated conveyor bed, and are further located intermediate the first, intake end, and the second, exhaust end of the linearly elongated conveyor bed.

6. A conveyor assembly as claimed in claim 5, and wherein the pair of drive assemblies each include individual electric motors, which, when energized by the controller, rotate an eccentric weight which is effective in imparting a desired reciprocal motion to the linearly elongated conveyor bed.

7. A conveyor assembly as claimed in claim 5, and wherein the pair of drive assemblies include individual electromagnet assemblies and which, when selectively energized by the controller, imparts a desired reciprocal motion to the linearly elongated conveyor bed.

8. A conveyor assembly as claimed in claim 5, and wherein the controller selectively energizes the respective drive assemblies so as to effect a predetermined reciprocal movement of the linearly elongated conveyor bed, and to further cause the product to move along the predetermined and selectively adjustable path of travel relative to the upwardly facing conveying surface.

9. A conveyor assembly as claimed in claim 8, and wherein the predetermined and selectively adjustable path of travel of the product relative to the upwardly facing conveying surface includes a path of travel which is oriented along the longitudinal axis of the linearly elongated conveyor bed; or along, and in contact with either of the upwardly extending sidewalls of the linearly elongated conveyor bed, or along either of the longitudinal axis of the linearly elongated conveyor bed, and the respective upwardly extending sidewalls of the linearly elongated conveyor bed.

10. A conveyor assembly as claimed in claim 1, and wherein the plurality of elongated and cylindrically shaped springs are, at least in part, narrowly cylindrical.

11. A conveyor assembly as claimed in claim 1, and wherein the respective elongated and cylindrically shaped springs are hollow.

12. A conveyor assembly as claimed in claim 1, and wherein at least some of the hollow, elongated and cylindrically shaped springs are filled with a second, resilient material, and which imparts to the respective, elongated and cylindrically shaped springs a different resiliency.

13. A conveyor assembly as claimed in claim 1, and wherein a pressurized fluid is enclosed within the hollow, elongated and cylindrically shaped springs, and which impart to the respective elongated and cylindrically shaped springs a different resiliency.

14. A conveyor assembly as claimed in claim 1, and wherein at least some of the elongated and cylindrically shaped springs are fabricated from carbon-fiber.

15. A conveyor assembly as claimed in claimed in claim 1, and wherein the respective elongated and cylindrically shaped springs each have opposite ends, and a diametral dimension which is uniform when measured between the first and second ends thereof.

16. A conveyor assembly as claimed in claim 1, and wherein the respective elongated and cylindrically shaped springs each have opposite first, and second ends, and a diametral dimension which diminishes in a region which is located intermediate the opposite, first and second ends thereof.

17. A conveyor assembly as claimed in claim 1, and wherein the respective elongated and cylindrically shaped springs each have opposite first, and second ends, and a diametral dimension which increases in a region which is located intermediate the opposite first and second ends thereof.

18. A conveyor assembly as claimed in claim 3, and wherein the conveying surface of the linearly elongated conveyor bed has a uniform transverse dimension when measured between the first, intake end, and the second exhaust end of the linearly elongated conveyor bed.

19. A conveyor assembly as claimed in claim 3, and wherein the conveying surface of the linearly elongated conveyor bed has a non-uniform transverse dimension when measured between the first, intake end, and the second exhaust end of the linearly elongate conveyor bed.

20. A conveyor assembly as claimed in claim 3, and wherein the conveying surface of the linearly elongated conveyor bed is planar.

21. A conveyor assembly as claimed in claim 3, and wherein the conveying surface of the linearly elongated conveyor bed is non-planar.

22. A conveyor assembly as claimed in claim 1, and further comprising:
   individual mounting fixtures for securing the elongated and cylindrically shaped springs to each of the base frame, and the linearly elongated conveyor bed, and wherein the respective mounting fixtures orient the respective plurality of elongated and cylindrically shaped springs in spaced relation, and laterally outwardly relative to, each of the base frame, and the linearly elongated conveyor bed so as allow effective cleaning of the respective elongated and cylindrically shaped springs, base frame, and linearly elongated conveyor bed.

23. A conveying assembly as claimed in claim 22, and wherein the respective elongated and cylindrically shaped springs are adhesively secured to the respective mounting fixtures.

24. A conveying assembly as claimed in claim 22, and wherein the respective elongated and cylindrically shaped springs are mechanically secured as by clamping to the respective mounting fixtures.

25. A conveyor assembly as claimed in claim 22, and wherein the respective elongated and cylindrically shaped springs have a length dimension of about 20 cm. to about 50 cm., and a diametral dimension of about 0.6 cm. to about 2 cm.

26. A conveyor assembly comprising:
   a reciprocally moveable, and linearly elongated conveyor bed having an upwardly facing conveying surface for supporting a product for movement therealong, and wherein the reciprocally moveable conveyor bed has opposite sides, first and second ends, a longitudinal axis extending between the first and second ends, and a peripheral edge which is, at least in part, parallel to the longitudinal axis, and wherein a pair of upwardly extending sidewalk are individually affixed along the peripheral edge, and are further located on the opposite sides of the conveyor bed;

a base frame for supporting the linearly elongated conveyor bed for reciprocal motion, and in spaced relation relative thereto;

a plurality of narrowly elongated and cylindrically shaped springs which have opposite ends, and wherein one end of the respective cylindrically shaped springs are mounted on the base frame, and the opposite end of the respective cylindrically shaped springs are mounted on the elongated conveyor bed, and wherein the respective cylindrically shaped springs position the elongated conveyor bed in spaced, reciprocally moveable relation relative to the base frame;

a pair of drive assemblies which are mounted, at least in part, on the base frame, and which further, when energized, individually impart a given force to the reciprocally moveable conveyor bed so as to cause product movement between the first and second ends thereof, and wherein the pair of drive assemblies are individually located, at least in part, on the opposite sides of the linearly elongated conveyor bed, and are further located intermediate the first and second ends thereof; and a controller for selectively energizing the pair of drive assemblies so as to cause the product, which is supported on the conveying surface of the linearly elongated conveyor bed, to move along a predetermined, and selectively adjustable path of travel relative to the upwardly facing surface, and which includes a path of travel which is oriented along the longitudinal axis of the linearly elongated conveyor bed; or along and in contact with either of the upwardly extending sidewalls of the linearly elongated conveyor bed; or along either of the longitudinal axis, and at least one of the upwardly extending sidewalls of the linearly elongated conveyor bed.

* * * * *